United States Patent Office 2,967,203
Patented Jan. 3, 1961

2,967,203

VINYL ETHER POLYMER SYNTHETIC LUBRICANTS

Joseph F. Nelson and Fred W. Banes, Westfield, and William P. FitzGerald, Florham Park, N.J., assignors to Esso Research and Engineering Company, a corporation of Delaware No Drawing. Filed May 28, 1954, Ser. No. 433,302

7 Claims. (Cl. 260—615)

This invention relates to vinyl ether polymers boiling within the lubricating oil range and to an improved process for their preparation. Particularly the invention relates to a novel process for the preparation of synthetic lubricating oils which comprises the steps of polymerizing a vinyl ether having from about 4 to about 14 carbon atoms in the presence of a specific group of alkyl peroxide and organic hydroperoxide catalysts at a temperature above the decomposition temperature of the catalyst.

The prior art contains many references to vinyl ether polymers and to methods for obtaining polymeric and copolymeric materials of vinyl ethers. For instance, U.S. Patent #2,016,490, issued to Fikentscher in 1935, teaches that high molecular weight products may be made by copolymerizing vinyl ethers with other neutral polymerizable organic compounds containing an aliphatic double linkage. Threads, coating compositions, varnishes or lacquers may be made from the materials described in this patent. U.S. Patent #2,020,703, issued to Schumann et al. in 1935, teaches the formation of lubricating oil additives by polymerizing vinyl ethers of unsaturated alcohols. In U.S. Patent #2,020,714, issued to Wulff et al. in 1935, there is taught that valuable lubricating oil additives may be prepared by polymerizing vinyl esters of fatty acids or vinyl ethers. These materials are described as having molecular weights in excess of about 1000. In U.S. Patent #2,104,000 issued to Reppe et al. in 1937, the art is taught that vinyl ethers may be polymerized into useful materials by contacting them with an anhydrous inorganic acid.

In the prior art the vinyl ether polymeric materials are ordinarily prepared using a Freidel-Crafts catalyst at temperatures below about 100° C. The resulting polymers are of high molecular weights, that is in the range of from about 1,000 to 10,000. These materials are excellent products for adhesives, lubricant additives, resins, and the like, but their properties are such that they are completely unsuited for use as lubricating oils.

The present invention differs from those described in the prior art as illustrated above in that the instant inventors have discovered that valuable low molecular weight vinyl ether polymers boiling in the lubricating oil range may be prepared by a process which involves the use of a specific group of alkyl peroxide and organic hydroperoxide catalysts.

It has now been found, and forms the object of this invention, that vinyl ethers having from about 4 to about 14 carbon atoms per molecule may be polymerized to obtain oily low molecular weight polymeric materials that have utility as lubricating oils. The invention will be further described by reference to the following illustrative examples:

EXAMPLE I

A 1.8 liter stainless steel bomb was charged with 500 cc. (376 g.) of vinyl ethyl ether, 400 cc. of cyclohexane and 23.8 gms. (6.33 wt. percent) of di-tertiary butyl peroxide. The diluent to monomer ratio was 0.8:1. The bomb was closed, agitated by rocking, and heated to 159° C. This temperature was maintained for 4 hours. The bomb was cooled, the contents recovered and stripped to an overhead temperature of 100° C. at atmospheric pressure. The product weighed 295.4 gms. and had the following analysis:

Percent C _____ 68.2
Percent H _____ 11.1
Percent O _____ 20.7

This gives a carbon, hydrogen and oxygen ratio of $C_4H_8O$ which is the same as that of vinyl ethyl ether.

The product was topped to an overhead temperature of 340° C. (156° C. at 3 mm. of Hg). The following inspection data were obtained:

Kinematic viscosity, SUS:
  at 210° F. _____ 64.01
  at 100° F. _____ 598.3
Viscosity index _____ 77
Pour point, °F. _____ −20
Flash (O.C.), °F. _____ 425

EXAMPLE II

A 1.9 liter bomb was charged with 376 gms. (400 cc.) of vinyl ethyl ether, 600 cc. of cyclohexane, and 30 gms. of a 75% cumene hydroperoxide solution. The diluent to monomer ratio was 1.5:1. While being agitated, the bomb was heated to 125° C. and this temperature maintained for 4 hours. When the bomb had cooled and the reaction mixture topped to 100° C., there remained 107.4 gms. of oily liquid product.

EXAMPLE III

A charge consisting of 400 cc. (300 gms.) of vinyl ethyl ether, 600 cc. of cyclohexane, and 23.8 gms. of tertiary butyl hydroperoxide was placed in a 1.8 liter stainless steel bomb and heated to 125° C. for 4 hours. The diluent to monomer ratio was 1.5:1. The bomb was cooled and the reaction mixture distilled to an overhead temperature of 100° C. The material remaining as bottoms weighed 199.6 gms. and was a light yellow liquid.

This material, after topping to 320° C., gave the following inspections:

Kinematic viscosity, SUS:
  at 210° F. _____ 58.94
  at 100° F. _____ 491.6
Viscosity index _____ 75
Pour point, °F. _____ −30
Flash (O.C.), °F. _____ 390

EXAMPLE IV

A bomb was charged with 385 gms. (500 cc.) of vinyl isobutyl ether, 500 cc. of cyclohexane and 23.8 gms. of di-tertiary butyl peroxide. The diluent to monomer ratio was 1:1. The bomb was agitated and heated to 156–158° C. for 2 hours. The reaction mixture, recovered after cooling the bomb, was stripped to 100° C. The product amounted to 303 gms. About 65% of the product boiled in the lube oil range and exhibited the following properties:

Kinematic viscosity, SUS:
  at 210° F. _____ 86.23
  at 100° F. _____ 1317.60
Viscosity index _____ 60
Pour point, °F. _____ −10
Flash (O.C.), °F. _____ 445

EXAMPLE V

A mixture of 162 gms. (200 cc.) of vinyl 2-ethylhexyl ether, 800 cc. of cyclohexane and 23.8 gms. (14.7%) of ditertiary butyl peroxide was charged to a stainless steel bomb. The diluent to monomer ratio was 4:1. The bomb was agitated and heated to 153–162° C. for 4 hours. At the end of this cycle the bomb was cooled, the contents recovered, and stripped to an overhead temperature of 180° C. The product, a yellow liquid oil, weighed 145.7 gms.

The fraction boiling above 320° C. constituted 80% of the product and had the following properties:

Kinematic viscosity, SUS:
    at 210° F. _____ 43.57
    at 100° F. _____ 148
Viscosity index _____ 110
Pour point, ° F. _____ <−35
Flash (O.C.), ° F. _____ 360

EXAMPLE VI

A pressure vessel was filled with a solution consisting of 164 gms. (about 200 cc.) of vinyl Oxo nonyl ester, 800 cc. of cyclohexane, and 23.8 gms. of di-tertiary butyl peroxide. The diluent monomer ratio was 4:1. The vessel was closed, agitated and heated to 125–168° C. for 6 hours. After cooling, the reaction mixture was withdrawn and stripped to an overhead temperature of 220° C. (105° C. @ 20 mm. of Hg). The liquid, oily product weighed 149.3 gms.

EXAMPLE VII

A mixture composed of 91 gms. (ca. 110 cc.) of vinyl dodecyl ether, 300 cc. of cyclohexane and 4.3 weight percent of ditertiary butyl peroxide (based on the ether) was charged to a one liter stainless steel bomb and heated to 155° C. for 4 hours. The diluent monomer ratio was 2.73:1. Agitation was provided in the conventional manner by a mechanical shaker. The reaction mixture was stripped to an overhead temperature of 118° C. at 0.8 mm. of Hg. There remained 67 grams of product with the following physical properties:

Kinematic viscosity, SUS:
    @ 210° F. _____ 49.87
    @ 100° F. _____ 178.3
Viscosity index _____ 140
Pour point, ° F. _____ +30
Flash (O.C.), ° F. _____ 390

EXAMPLE VIII

A one liter stainless steel bomb was charged with a mixture of 150 cc. (113 gms.) of vinyl ethyl ether, 450 cc. cyclohexane and 2 weight percent of di-tertiary butyl peroxide (based on the ether). The diluent to monomer ratio was 3:1. After heating to 155° C. for 4 hours with agitation, the bomb was opened, the reaction mixture recovered and distilled to an overhead temperature of 100° C. A yield of 49 gms. of liquid in the lube oil range was obtained.

The gist of the present invention lies in the choice of catalyst used for the polymerization. It has been found that only a certain specific group of alkyl peroxide and organic hydroperoxide catalysts are operable in preparing the low molecular weight polymers useful as lubricating oils. Among the catalysts that are operable are di-tertiary butyl peroxide, tertiary butyl hydroperoxide and cumene hydroperoxide, with the former being utilized in the preferred embodiment. The catalyst is used in amounts varying from about 1 to 15 weight percent, based on the weight of the monomer, with from 2 to 10% being preferred.

One of the best known peroxide catalysts is benzoyl peroxide. This catalyst is widely used in chemical reactions and is a very useful tool to the organic chemist. That this commonly known catalyst will not operate in the process of the invention is shown in the following examples.

EXAMPLE IX

A charge consisting of 200 cc. (150 gms.) of vinyl ethyl ether, 300 cc. of cyclohexane, and 4 gms. (2.7%) of benzoyl peroxide were heated for 4 hours at 95° C. in a stainless steel bomb. The diluent to monomer ratio was 1.5:1. When the reaction mixture was recovered and stripped to 100° C. to remove diluent and unreacted monomer, it was found that no product had been formed.

EXAMPLE X

The same equipment used in the previous example was charged with 91 gms. (ca. 110 cc.) of vinyl dodecyl ether, 300 cc. of cyclohexane, and 1.5 gms. of benzoyl peroxide. The diluent to monomer ratio was 2.73:1. The reaction vessel was heated for 4 hours at 95° C. The reaction product was stripped to 120° C. at 1 mm. of Hg to remove unreacted vinyl ether and diluent. Substantially no liquid residue was obtained.

In addition to the selection of the catalyst, other conditions that must be met to satisfactorily perform the inventive process are as follows:

(1) Temperature: The temperature used for carrying out the process of the invention will depend to a certain extent upon the catalyst used and upon the monomer concentration. It is essential that the temperature be maintained at or above the decomposition temperature of the catalyst used. Ordinarily temperatures within a range of from about 90° C. to 250° C. are operable, with a temperature of from 100° C. to 200° C. being especially preferred.

(2) Time: The reaction time will also depend upon the monomer, the monomer concentration and the catalyst used. It will generally be found that the reaction will be completed in about 1 to 8 hours, with from 2 to 6 hours being preferred. Obviously this reaction time could be realized in either a batch or continuous polymerization process.

(3) Diluent: Most desirable products are obtained when the reaction is carried out in the presence of a diluent to monomer ratio of from 0.8:1 to 5:1.

The diluent used may be selected from those diluents that are unreactive in the presence of free radicals. Hydrocarbon solvents such as cyclohexane, benzene, n-hexane, petroleum ether, n-heptane, n-octane, etc., or mixtures of these may be used and are preferred. Oxygenated solvents such as tert.-butyl alcohol, di-alkyl ethers, etc., may also be used.

(4) The product is purified by methods known to the art: Ordinarily stripping the final reaction mixture to a temperature high enough to remove the diluent and any un-polymerized monomer will result in a sufficiently pure product. Generally the product is stripped under vacuum or at atmospheric pressure to an equivalent overhead temperature of 320° to 350° C. to obtain optimum lube oil properties.

In the preferred embodiment of the invention, a vinyl ether containing from 4 to 14 carbon atoms is admixed with 1 to 4 parts by volume of cyclohexane. 1 to 15% of an alkyl peroxide or an organic hydroperoxide (as di-t-butyl peroxide, t-butyl hydroperoxide or cumene hydroperoxide) is added and the temperature raised to between 100° and 200° C. The reaction is carried out for about 2 to 6 hours. The product is then stripped to an overhead temperature of about 340° C. to obtain the desired final product.

Industry has found that to furnish the desired lubricating characteristics, a synthetic lubricant should have an ASTM pour point below about 35° F., a flash point above about 350° F., and a viscosity at 210° F. of between about 30 and 280 SUS. The vinyl ether polymers of this invention are restricted to those having these properties.

The materials of this invention are compatible with the known lubricant additives, such as viscosity index improvers, pour point depressors, detergents, oxidation inhibitors and the like. For instance, such materials as $C_{8-10}$ acrylate and methacrylate esters, polymerized butylene, $C_{8-18}$ fumarate-vinyl fatty acid ester, wax-naphthalene condensates, and the like may be blended with the vinyl ethers of this invention to enhance special characteristics. Although the vinyl ether polymers of the invention may be used as lubricants per se, they may also be blended with other lubricants, either naturally occurring mineral oils or other synthetic lubricants such as formals, silicone polymers, ethers, esters, ether-esters, glycol-ethers and the like. The vinyl ether polymers may also be converted to solid or semi-solid lubricants by the incorporation of thickening agents, such as the commonly known grease forming soaps represented by metal soaps of fatty acids, or inorganic thickening agents such as silica gel, bentonite and the like.

To summarize briefly, the instant invention relates to vinyl ether polymers having properties that make them desirable as synthetic lubricating oils, and to an improved method for the preparation of such polymers. The invention particularly relates to a process which comprises the steps of polymerizing vinyl ethers having from about 4 to 14 carbon atoms per molecule in the presence of a diluent and using as a catalyst from .1 to 15% of an alkyl peroxide or organic hydroperoxide. The most preferred embodiment of the invention comprises the steps of admixing a vinyl ether containing from 4 to 14 carbon atoms with from 1 to 4 parts by volume of a saturated hydrocarbon solvent or benzene, adding to the mixture from 1 to 15 weight percent of di-tertiary butyl peroxide, t-butyl hydroperoxide or cumene hydroperoxide, heating the mixture to about 125° to 170° C. for from 2 to 6 hours, and stripping the resulting mixture to an overhead temperature of about 120–140° C. at a pressure of 1 mm. Hg or 320° to 350° C. at atmospheric pressure to obtain the desired final product.

What is claimed is:

1. A process for the preparation of low molecular weight homopolymers of vinyl alkyl ethers having utility as synthetic lubricating oils which comprises the steps of admixing a vinyl alkyl ether monomer having from about 4 to about 14 carbon atoms per molecule with a diluent that is unreactive to free radicals in a diluent monomer ratio of about 0.8:1 to about 5:1 by volume, adding to the mixture from about 2 to 10 wt. percent of a peroxide catalyst selected from the group consisting of ditertiary-butyl peroxide, tertiary butyl hydroperoxide and cumene hydroperoxide, heating to a temperature within the range of about 100 to 200° C. and yet above the decomposition temperature of the catalyst, maintaining that temperature for about 2 to 6 hours and stripping the reaction product at a temperature equivalent to between about 300 to about 350° C. at atmospheric pressure, to obtain as a residue a vinyl alkyl ether homopolymer having an ASTM pour point below 35° F., a flash point above about 350° F., and a viscosity at 210° F. of between about 30 to about 280 SUS.

2. A process according to claim 1 wherein said vinyl ether monomer contains about 6 to about 12 carbon atoms.

3. A process according to claim 1 wherein said catalyst is di-tertiary-butyl peroxide.

4. A process according to claim 1 wherein said catalyst is tertiary butyl hydroperoxide.

5. A process according to claim 1 wherein said catalyst is cumene hydroperoxide.

6. A process according to claim 1 wherein said diluent is selected from the group consisting of cyclohexane, benzene, petroleum ether, n-hexane, n-heptane, n-octane, tertiary butyl alcohol, di-alkyl ethers and mixtures of the above.

7. A process for the preparation of low molecular weight homopolymers of vinyl alkyl ether having utility as synthetic lubricating oils which comprises the steps of admixing a vinyl alkyl ether having about 4 to 12 carbon atoms in the molecule with cyclohexane as a diluent in a diluent to monomer ratio by volume of about .8:1 to 5:1, adding to the mixture from about 2 to about 6 weight percent of di-tertiary butyl peroxide as a catalyst, heating the mixture in a pressure vessel to a temperature of about 100 to about 200° C. such that the catalyst decomposes for about 2 to about 6 hours and stripping the resulting material to a top temperature of about 300 to about 350° C. at atmospheric pressure to obtain a vinyl alkyl ether homopolymer material as a residue having a flash point in excess of 350° F. and a viscosity in the range of about 30 to about 280 SUS at 210° F.

References Cited in the file of this patent

UNITED STATES PATENTS

| | | |
|---|---|---|
| 2,020,703 | Schumann et al. | Nov. 12, 1935 |
| 2,020,714 | Wulff et al. | Nov. 12, 1935 |
| 2,104,000 | Reppe et al. | Dec. 28, 1937 |
| 2,381,561 | Staudinger et al. | Aug. 7, 1945 |
| 2,391,920 | Peterson | Jan. 1, 1946 |
| 2,748,170 | Benoit et al. | May 29, 1956 |

OTHER REFERENCES

Schildknecht et al.: Ind. & Eng. Chem., vol. 41 (1949), pages 2891–93 (3 pages).

Haward et al.: Trans Faraday Soc., vol. 47 (1951), pages 212–222.

Johnson et al.: Jour. Amer. Chem. Soc., vol. 74 (1952), pages 938–943.